United States Patent
Baldwin et al.

(10) Patent No.: US 11,783,285 B2
(45) Date of Patent: *Oct. 10, 2023

(54) YARD MANAGEMENT SYSTEM

(71) Applicant: Walmart Apollo, LLC, Bentonville, AR (US)

(72) Inventors: Blake A. Baldwin, Baldwin, AR (US); Jimmy L. Easter, Bentonville, AR (US); Adam L. Cline, Bentonville, AR (US); Joseph Courtland Halbrook, Centerton, AR (US); John S. Meredith, Bentonville, AR (US); Andrew B. Millhouse, Gilbert, AZ (US); Jacob R. Schrader, Sterling, IL (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,207

(22) Filed: Jun. 1, 2022

(65) Prior Publication Data

US 2022/0309459 A1 Sep. 29, 2022

Related U.S. Application Data

(63) Continuation of application No. 17/194,112, filed on Mar. 5, 2021, now abandoned, which is a
(Continued)

(51) Int. Cl.
*G06Q 10/083* (2023.01)
*G06K 7/14* (2006.01)

(52) U.S. Cl.
CPC ....... *G06Q 10/0838* (2013.01); *G06K 7/1413* (2013.01)

(58) Field of Classification Search
CPC .................. G06Q 10/0838; G06K 7/1413
(Continued)

(56) References Cited

U.S. PATENT DOCUMENTS 6,269,763 B1 8/2001 Woodland
6,401,078 B1 6/2002 Roberts
(Continued)

FOREIGN PATENT DOCUMENTS

WO 2019067827 4/2019

OTHER PUBLICATIONS

"The GPRS-based location system for the long-distance freight" Published by IEEE (Year: 2006).*
(Continued)

*Primary Examiner* — Zeina Elchanti
(74) *Attorney, Agent, or Firm* — Fitch, Even, Tabin & Flannery, LLP

(57) ABSTRACT

Yard management systems and methods are described. A yard management system comprises a database holding load information, a mobile application associated with a user account and executable on a mobile device. The mobile application when executed acquires the identifications of the load, queries the database for the load information, and generates a machine-readable representation corresponding to the identifications of the load, an autonomous yard vehicle configured to mechanically couple with a cargo trailer. The system further comprises a computing system programmed to, in response to detecting the mobile device at the transfer location, navigate to the cargo trailer and guide the coupling between the autonomous yard vehicle and the cargo trailer.

20 Claims, 17 Drawing Sheets

Related U.S. Application Data continuation of application No. 16/145,391, filed on Sep. 28, 2018, now Pat. No. 10,970,670.

(60) Provisional application No. 62/564,671, filed on Sep. 28, 2017.

(58) Field of Classification Search
USPC .......................................................... 705/341
See application file for complete search history.

(56) References Cited

U.S. PATENT DOCUMENTS

| | | | |
|---|---|---|---|
| 6,421,586 B1* | 7/2002 | Nicotera | G06Q 10/08 |
| | | | 701/1 |
| 8,275,508 B1 | 9/2012 | Adams | |
| 8,671,002 B2 | 3/2014 | Stefik | |
| 9,213,957 B2 | 12/2015 | Stefik | |
| 10,970,670 B2 | 4/2021 | Baldwin | |
| 2005/0174258 A1 | 8/2005 | Yamanouchi | |
| 2005/0288947 A1* | 12/2005 | Mallonee | G06Q 10/0833 |
| | | | 705/333 |
| 2006/0030333 A1 | 2/2006 | Ward | |
| 2007/0210156 A1* | 9/2007 | Bochicchio | G06Q 10/08 |
| | | | 235/385 |
| 2008/0010016 A1 | 1/2008 | Wickey | |
| 2009/0059004 A1* | 3/2009 | Bochicchio | B66F 17/003 |
| | | | 348/148 |
| 2009/0216438 A1 | 8/2009 | Shafer | |
| 2009/0276153 A1 | 11/2009 | Lee | |
| 2012/0095935 A1 | 4/2012 | Mowat | |
| 2012/0146763 A1 | 6/2012 | Teti | |
| 2013/0046525 A1 | 2/2013 | Ali | |
| 2013/0301995 A1 | 11/2013 | Thome | |
| 2013/0332004 A1 | 12/2013 | Gompert | |
| 2014/0006302 A1 | 1/2014 | McQuillan | |
| 2014/0035723 A1 | 2/2014 | Alfar | |
| 2015/0006005 A1 | 1/2015 | Yu | |
| 2015/0046229 A1 | 2/2015 | Gollu | |
| 2015/0241223 A1* | 8/2015 | Davidson | G01C 21/3844 |
| | | | 701/532 |
| 2015/0371178 A1 | 12/2015 | Abhyanker | |
| 2016/0037478 A1 | 2/2016 | Skaaksrud | |
| 2016/0379168 A1 | 12/2016 | Foerster | |
| 2017/0123421 A1 | 5/2017 | Kentley | |
| 2017/0221072 A1 | 8/2017 | AthulurutIrumala | |
| 2017/0308852 A1 | 10/2017 | Beach-Drummond | |
| 2018/0075547 A1* | 3/2018 | Pere | G06Q 10/06312 |
| 2018/0197142 A1* | 7/2018 | Park | G06F 16/22 |
| 2018/0216459 A1 | 8/2018 | Heikkila | |
| 2018/0324390 A1* | 11/2018 | Hill | H04N 7/181 |
| 2019/0064835 A1 | 2/2019 | Hoofard | |
| 2019/0067827 A1 | 2/2019 | Sakai | |
| 2019/0095861 A1 | 3/2019 | Baldwin | |
| 2021/0216966 A1 | 7/2021 | Baldwin | |
| 2022/0011080 A1* | 1/2022 | Thompson | F42B 30/006 |

OTHER PUBLICATIONS

Lloyd, Simon, New online parking deals now available for quick trips to Sydney Airport, Sydney Airport, Media Releases, Mar. 31, 2014.

International Search Report and Written Opinion from related International Patent Application No. PCT/US2018/053286 dated Nov. 30, 2018, 7 pages.

An optimization model for storage yard management in transshipment hubs Published by Department of Industrial and Systems Engineering, National University of Singapore (Year: 2007).

PCT; App. No. PCT/US2018/053286; International Preliminary Report on Patentability dated Mar. 31, 2020.

USPTO; U.S. Appl. No. 16/145,391; Notice of Allowance dated Dec. 7, 2020.

USPTO; U.S. Appl. No. 16/145,391; Office Action dated Jun. 26, 2020.

"The GPRS-based location system for the long distance freight" Published by First International Conference on Communications and Networking in China (Year: 2006).

USPTO; U.S. Appl. No. 17/194,112; Office Action dated Jan. 26, 2022.

USPTO; U.S. Appl. No. 17/194,112; Notice of Allowance dated Mar. 3, 2022.

\* cited by examiner

| | A | B | C | D | E | F | G | H | I | J | K |
|---|---|---|---|---|---|---|---|---|---|---|---|
| 1 | PO Num* | PRO# | BOL# | Pickup Date* | Case Qty* | Weight* | Orig State* | Orig Country* | Payment Type* | Unitization* | Free Astray |
| 2 | 6085535991 | | | 9/19/2016 | 2746 | 35178 | IL | United States | Collect | Pallet | 0 |
| 3 | 6085536121 | | | 9/19/2016 | 160 | 1568 | IL | United States | Collect | Pallet | 0 |
| 4 | 6085134301 | | | 7/5/2016 | 607 | 15487 | IL | United States | Collect | Pallet | 0 |
| 5 | 6085275951 | | | 9/7/2016 | 1348 | 39334 | MO | United States | Collect | Pallet | 0 |
| 6 | 6085374591 | | | 9/16/2016 | 2625 | 41234 | TX | United States | Prepaid | Pallet | 0 |
| 7 | 6085383521 | | | 9/17/2016 | 2537 | 41743 | IL | United States | Collect | Pallet | 0 |
| 8 | 6085526111 | | | 9/17/2016 | 242 | 1680 | IL | United States | Collect | Pallet | 0 |
| 9 | 6085383531 | | | 9/19/2016 | 2556 | 41893 | IL | United States | Collect | Pallet | 0 |
| 10 | 6085424741 | | | 9/19/2016 | 52 | 406 | IL | United States | Collect | Pallet | 0 |
| 11 | 6085549471 | | | 9/21/2016 | 1850 | 8285 | IL | United States | Prepaid | Pallet | 0 |
| 12 | 6085314371 | | | 9/19/2016 | 88 | 964 | TN | United States | Prepaid | Pallet | 0 |
| 13 | 6085529881 | | | 9/19/2016 | 3727 | 37961 | TN | United States | Prepaid | Pallet | 0 |
| 14 | 6085949691 | | | 9/16/2016 | 36 | 18000 | IL | United States | Prepaid | Pallet | 0 |

FIG. 5

YARD MANAGEMENT SYSTEM

RELATED APPLICATIONS

This application is a continuation of application Ser. No. 17/194,112, filed Mar. 5, 2021, which is a continuation of application Ser. No. 16/145,391, filed Sep. 28, 2018, now U.S. Pat. No. 10,970,670, which claims the benefit of priority of App. No. 62/564,671, filed Sep. 28, 2017, each of which is incorporated herein by reference in its entirety.

BACKGROUND

In a distribution center, a truck driver needs to supply paperwork to the distribution center before dropping off the freight they are moving. This gate-in process can be time consuming and inaccurate.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 5 is a graphical user interfaces (GUI) of a database for uploading load information according to an exemplary embodiment of the present disclosure.

DETAILED DESCRIPTION

Methods and systems are provided herein managing autonomous yard vehicles. A yard management system (YMS) of a distribution center (DC) can be used with a scheduler database, user mobile devices, and other DC systems to facilitate an expedited and accurate check-in process for trailer drivers and the freight on the trailers, and direct the autonomous yard vehicles, for example, autonomous tractors, to couple with and move the trailer associated with the driver to the assigned locations in the distribution center.

The yard management system can facilitate the streamlined check-in process at the DC by receiving data from the truckers dispatch or vendor. The yard management system can receive load information generated by the scheduler and compile the information such that the load information can be shared electronically when the driver arrives at the distribution center. The load information can be sent to the yard management system (YMS) and YMS can send instruction information to the driver regarding where to load or unload the freight in the distribution center.

The yard management system allows the driver to pre-populate one or more electronic forms with the load information required by the distribution center via a mobile app executed on a mobile device associated with the driver, such as a smart phone, and the load information can be transferred to the distribution center when the driver arrives. The yard management system also sends notifications to the driver to minimize interaction during check-in at the distribution center.

The yard management system can include a mobile application for all the drivers loading or unloading freight at the distribution center. The mobile app can be downloaded and installed on the mobile device, and can eliminate paperwork from the DC gate-in and gate-out processes. The driver has the option of inputting selected information into the mobile app when the driver is between the freight pickup location and the DC, which can eliminate the need for an asset protection (AP) associate at the distribution center to manually enter the information into the YMS system and will greatly reduce the interation time at the DC's truck gate and the potential for human error.

Accordingly, systems and methods provided herein can get the freight onto the yard faster and with higher accuracy as a driver can be guided to the correct location by the app once the driver enters the DC's yard area. The app can also track the specific drivers safety training at the distribution center to which the drivers are delivering and provide an estimated time of arrival (ETA) to both the driver and DC when a load of freight is accepted.

Figure 1:
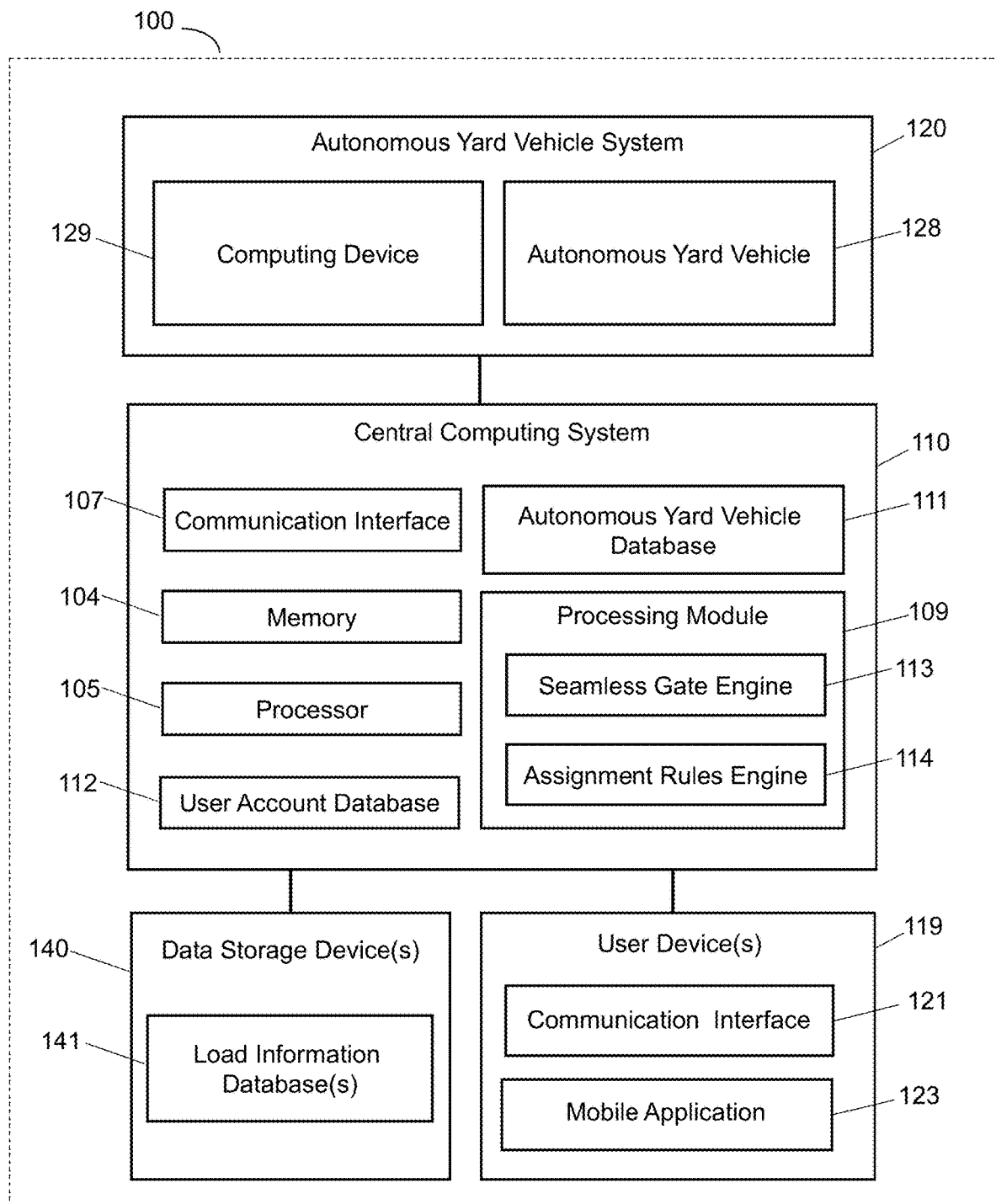
FIG. 1 is a block diagram showing a yard management system according to various embodiments of the present disclosure.

Referring now to FIG. 1, an exemplary yard management system 100 includes a central computing system 110, user device(s) 119, an autonomous yard vehicle system 120, and data storages device(s) 140. The central computing system 110 includes memory 104, a processor 105 and communication interface 107. The central computing system is configured to execute a processing module 109 and also includes or is able to access an autonomous yard vehicle database 111 and a user account database 112.

The autonomous yard vehicle database 111 includes information associated with the autonomous yard vehicles in the distribution center, such as type of the autonomous yard vehicle, current location of each autonomous yard vehicle, work schedule of each autonomous yard vehicle.

The user account database 112 includes information associated with user accounts, such as the user's profile, the user's previous delivery history, etc.

Processing module 109 includes a seamless gate engine 113 and an assignment rules engine 114. The seamless gate engine 113 executes the gate-in and gate-out process when the users or drivers arrives at the distribution center. The assignment rules engine 114 assigns the autonomous vehicles in the distribution center to the cargo trailers based on particular rules and load information received from the mobile application. For example, the assignment rules engine 114 can determine how to assign the autonomous tractors to the trailers based upon the received freight information, predetermined rules including locations of the autonomous vehicles and the trailer, priority of movement, freight requirements for the assigned door, etc.

Communication interface 107, in accordance with various embodiments can include, but is not limited to, a radio frequency (RF) receiver, RF transceiver, NFC device, a built-in network adapter, network interface card, PCMCIA network card, card bus network adapter, wireless network adapter, USB network adapter, modem or any other device suitable for interfacing with any type of network capable of communication and performing the operations described herein. Processor 105, in accordance with various embodiments can include, for example, but not limited to, a microchip, a processor (e.g., a central processing unit, a graphical processing unit), a microprocessor, a special purpose processor, an application specific integrated circuit, a microcontroller, a field programmable gate array, any other suitable processor, or combinations thereof. Central computing system 110 can also include, memory such as but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

As shown in FIG. 1, the autonomous yard vehicle system 120 includes an autonomous yard vehicle 128 that can be coupled to the trailer. The autonomous yard vehicle system 120 also includes a computing device 129 coupled with the autonomous yard vehicle 128 and equipped with a processor and communication interface. The computing device 129 receives the instructions of assigning the autonomous yard vehicle 128 from the center computing system 110 and navigates the autonomous vehicle 128 to the locations instructed by the central computing system 110. An exemplary embodiment of autonomous yard vehicle 128 is described in more detail below with reference to FIGS. 2A-2E and 3A-3C.

The data storage device(s) 140 can hold load information database(s) 141 containing load information related to each freight delivery. The load information includes, for example, delivery number, purchase order (PO) number, progressive number (PRO) number, bill of lading (BOL) number, pickup date, freight information, etc. The load information database(s) 141 is described herein in more detail below with reference to FIG. 3.

User device 119 includes communication interface 121 for communicating with the central computing system 110 and executes a mobile application 123. User device 119 may be smartphone, tablet or other mobile device equipped with a processor, communication interface 121 and mobile application 123. The mobile application 123 can generate a user interface for accepting user input and is configured to control an integrated data acquisition device such as, but not limited to, an active short-range communication device, such as a NFC or RFID reader, to acquire NFC/RFID tag information, and, in an exemplary embodiment, a camera on a user device to capture images of items. For example, the mobile application 123 can acquire delivery number inputted by the users and generate a machine-readable representation, such as a barcode, based on the load information related to the acquired delivery number.

Figure 2A:
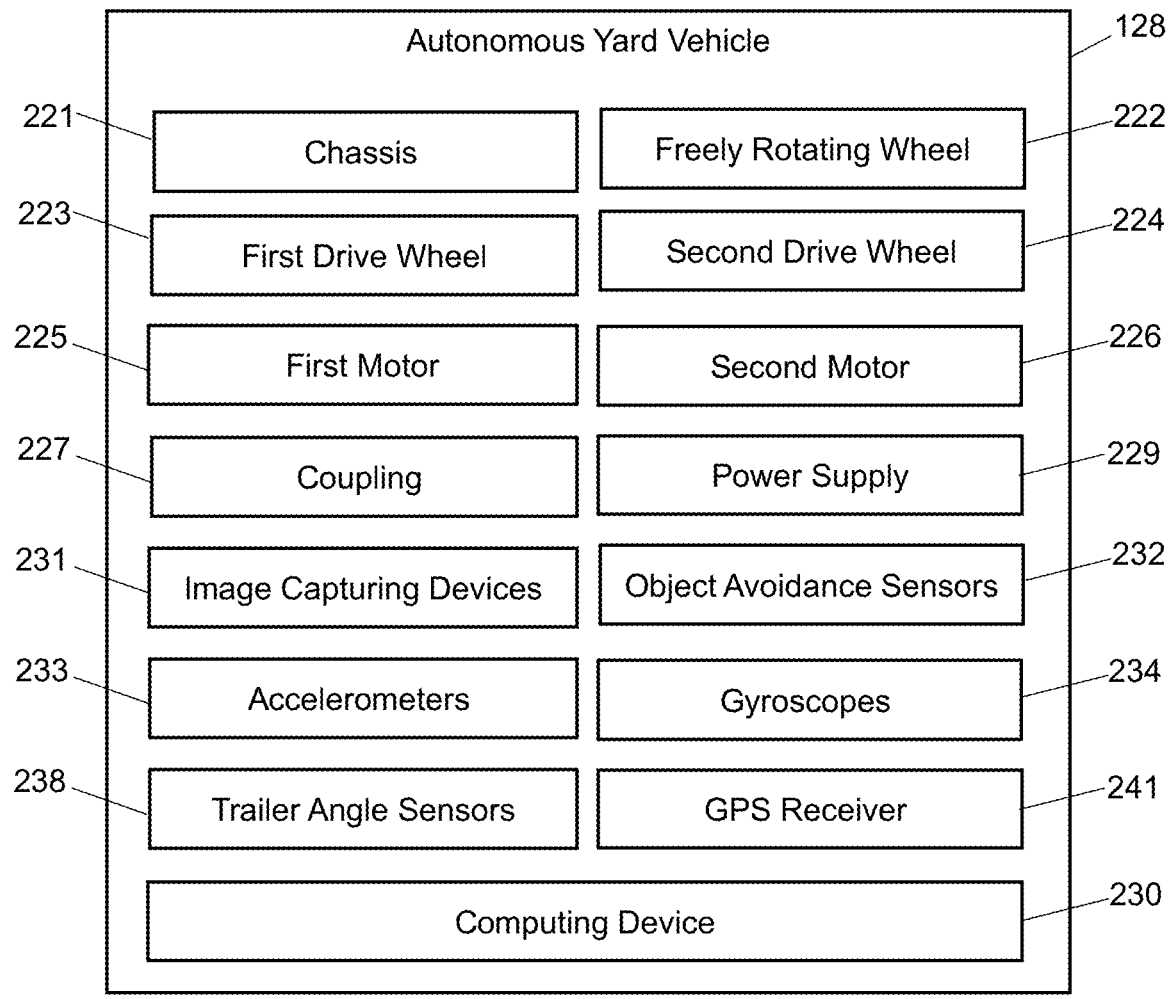
FIG. 2A is a block diagram illustrating the components of an autonomous yard vehicle according to various embodiments of the present disclosure.

As shown in FIG. 2A, the autonomous yard vehicle 128 includes a chassis 221, one or more freely rotating wheels 222, two drive wheels 223, 224, two motors 225, 226 that drive the drive wheels 223, 224 respectively, a coupling component 227 that can be coupled to the trailer, power supply 229, and a computing device 230. The autonomous yard vehicle 128 also includes image capturing devices 231, object avoidance sensors 232, accelerometers 233, gyroscopes 234, trailer angle sensors 238, and GPS receiver 241, etc.

The image capturing devices 231, such as cameras, can be associated with the autonomous yard vehicle 128 to capture images of the environment surrounding the vehicle. For example, the image capturing devices 231 can capture an image of a trailer number and extract text from the captured image, such that the autonomous vehicle can identify the trailer to be moved. Alternatively, the autonomous vehicle can includes a barcode scanner or RFID reader to identify the trailer number by reading a barcode or an RFID associated with the trailers.

The object avoidance sensors 232 can detect other objects when the autonomous yard vehicle 128 is moving in the yard. The accelerometers 233 can be used in the autonomous yard vehicle 128 to measure acceleration forces. The gyroscopes 234 can be used to provide stability or maintain a reference direction for navigating the autonomous yard vehicle 128. The trailer angle sensors 238 can detect the angle between the autonomous yard vehicle 128 and the trailer. The GPS receiver 241 determines a geographic location of the autonomous yard vehicle 128.

In one embodiment, the computing device 230 can be coupled to the autonomous yard vehicle 128 and equipped with a processor and communication interface. The computing device 230 can receive instructions for assigning the autonomous yard vehicle 128 from the central computing system 110, and drive the wheels 223, 224 to navigate to the location instructed by the central computing system 110 based on the geographic location determined by the GPS receiver 241 and the detection results of the object avoidance sensors 232 and trailer angle sensors 238.

Figure 2B:
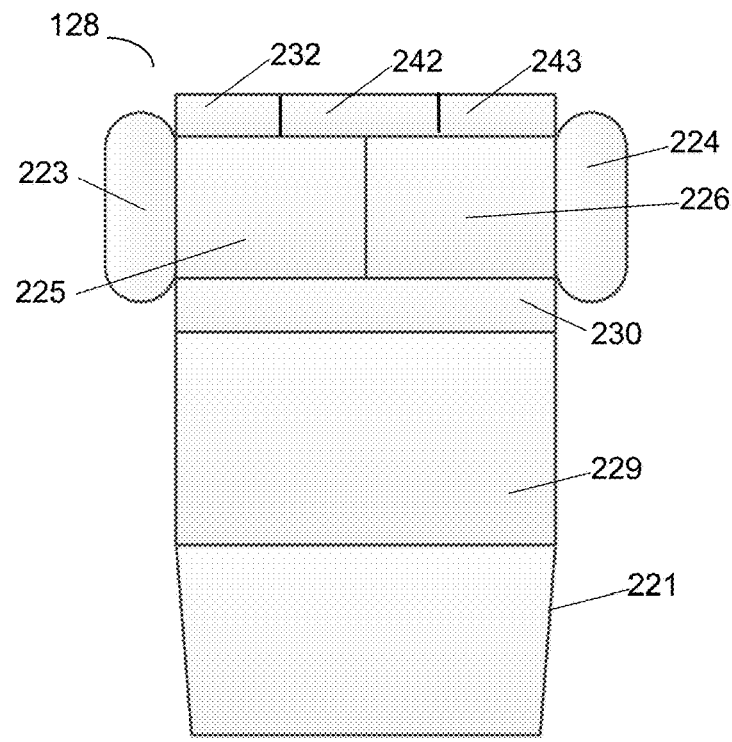
FIG. 2B illustrates a cutaway top view of an autonomous yard vehicle according to various embodiments of the present disclosure

FIG. 2B illustrates a cutaway top view of an autonomous yard vehicle 128 in accordance with embodiments of the present disclosure. The autonomous yard vehicle 128 includes the chassis 221, as well as the first motor 225 and the second motor 226, which are supported by the chassis 221. A first drive wheel 223 can be driven by the first motor 225, and a second drive wheel 224 can be driven by the second motor 226 such that the first and second drive wheels 223, 224 are driven independent of each other. The first and second drive motors 225, 226 can drive the first and second drive wheels 223, 224, respectively, at various speeds and torques. The first and second drive wheels 223, 224 can be driven at the same speed and torque or at different speeds and torques. In one embodiment, the first drive wheel 223 can be drive at a first speed that is different from a second speed at which the second drive wheel 224 is driven. For example, when the autonomous vehicle is turning, the outside wheel can be driven at a speed faster than the inside wheel to facilitate turning of autonomous yard vehicle and cause less wear on the tires.

The autonomous yard vehicle 128 also includes the power supply 229 that supplies energy to the components of the autonomous yard vehicle 128. For example, the power supply 229 can include batteries, hydrogen cell, a diesel generator, energy harvesting devices (e.g., solar cells), etc.

The object avoidance sensors 232 can be disposed about the chassis to detect a position of the chassis 221 relative to objects in the environment surrounding the autonomous yard vehicle 128. For example, the object avoidance sensors 232 can detect the cargo trailers around the autonomous yard vehicle 128. In one embodiment, the object avoidance sensors 232 can be disposed on at least one side of the chassis 221. For example, as shown in FIG. 2B, the object avoidance sensors 232 are disposed adjacent to the first and second drive motors 225, 226 or the first and second drive wheels 223, 224. In another embodiments, other accessories of the vehicle, such as vehicle lights 242 and antennas 243, etc., can be disposed adjacent to the object avoidance sensors 232.

The autonomous yard vehicle 128 further includes a computing system 230 operative coupled to the first and second drive motors 225, 226 and the object avoidance sensors 232. For example, the computing system 230 can include an onboard computer. The computing system 230 can be programmed to drive the first and second drive wheels 223, 224, via the first and second motors 225, 226, in response to outputs of the object avoidance sensors 232 to navigate to the cargo trailer and guide the coupling between the autonomous yard vehicle system and the cargo trailer.

Figure 2C:
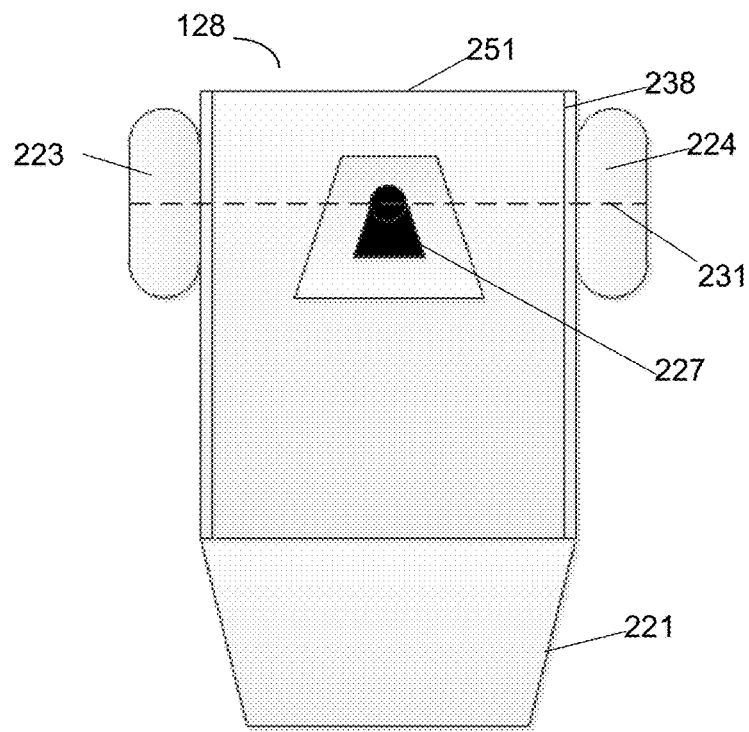
FIG. 2C illustrates a top view of an autonomous yard vehicle according to various embodiments of the present disclosure.

FIG. 2C illustrates a top view of the autonomous yard vehicle 128 in accordance with embodiments of the present disclosure. The first drive wheel 223 and the second drive wheel 224 are opposingly spaced from each other proximate to a proximal end 251 of the chassis 221 and aligned about a first axis of rotation 231. The autonomous yard vehicle 128 further includes a coupling 227 operatively coupled to the chassis 221. The coupling 227 has a female connector, such as a slot, configured to receive and mechanically couple with a male connector of a cargo trailer, such as a kingpin. The trailer angle sensors 238 can be disposed in an array along one or both sides of the chassis 221. The trailer angle sensors 238 can be used to identify the angle between the autonomous yard vehicle 128 and a cargo trailer to be coupled or already coupled with the autonomous yard vehicle 128. The coupling between the autonomous yard vehicle 128 and the cargo trailer is described herein in more detail below with respect to FIGS. 3A-3C. As shown in FIG. 2C, the slot of the coupling 227 is aligned with and vertically offset from the first axis of rotation 231.

Figure 2D:
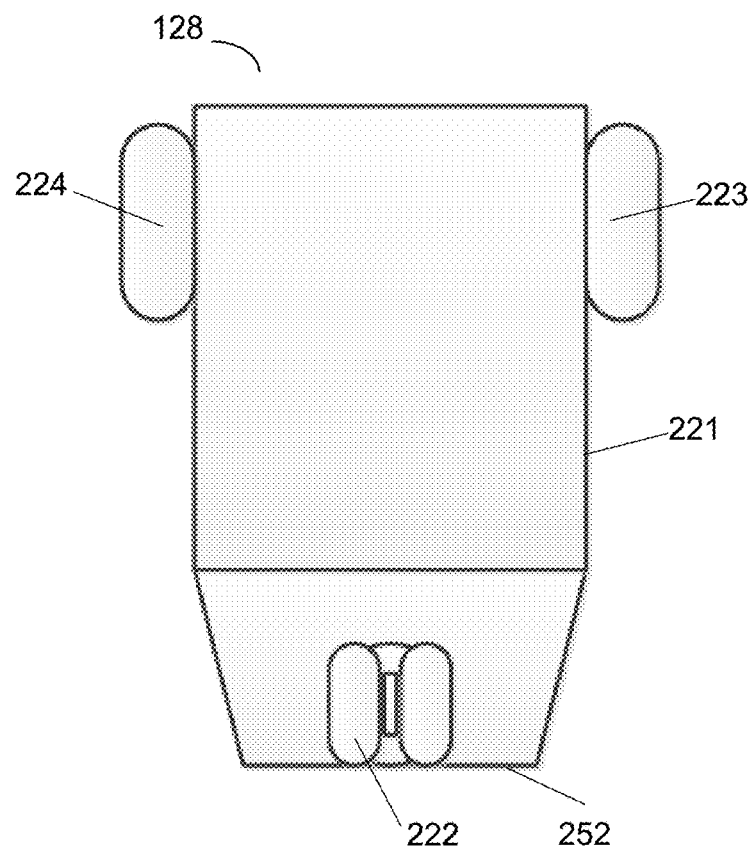
FIG. 2D illustrates a bottom view of an autonomous yard vehicle according to various embodiments of the present disclosure.
Figure 2E:
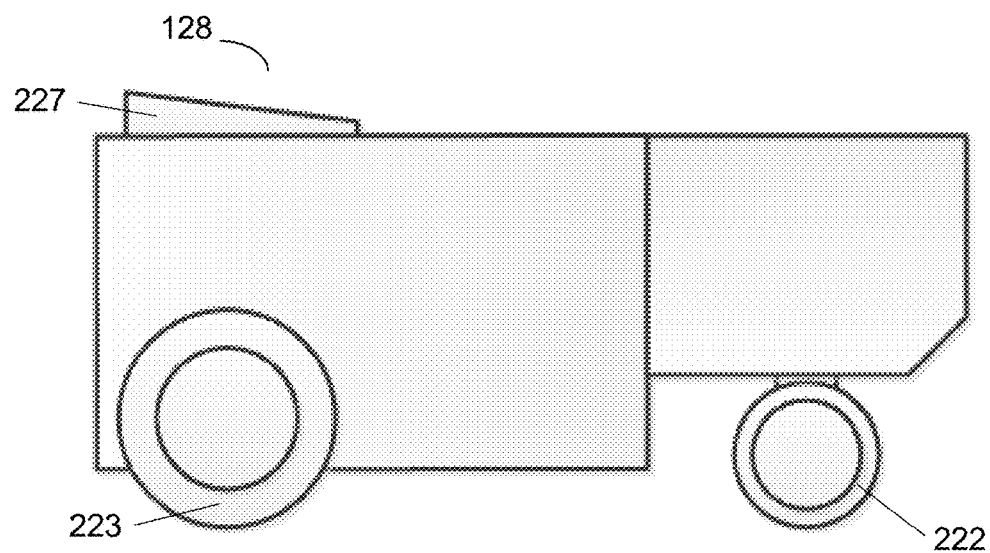
FIG. 2E illustrates a side view of an autonomous yard vehicle according to various embodiments of the present disclosure.

FIGS. 2D and 2E illustrate a bottom view and a side view, respectively, of the autonomous yard vehicle 128 according to various embodiments of the present disclosure. The autonomous yard vehicle 128 includes at least one freely rotating wheel 222 disposed proximate to a distal end 252 of the chassis 221. For example, the freely rotating wheel 222 can be a caster disposed on the chassis 221 and supporting the autonomous vehicle. The caster includes a housing coupled to the autonomous yard vehicle 128, and a wheel rotatable coupled to the housing.

Figure 3A:
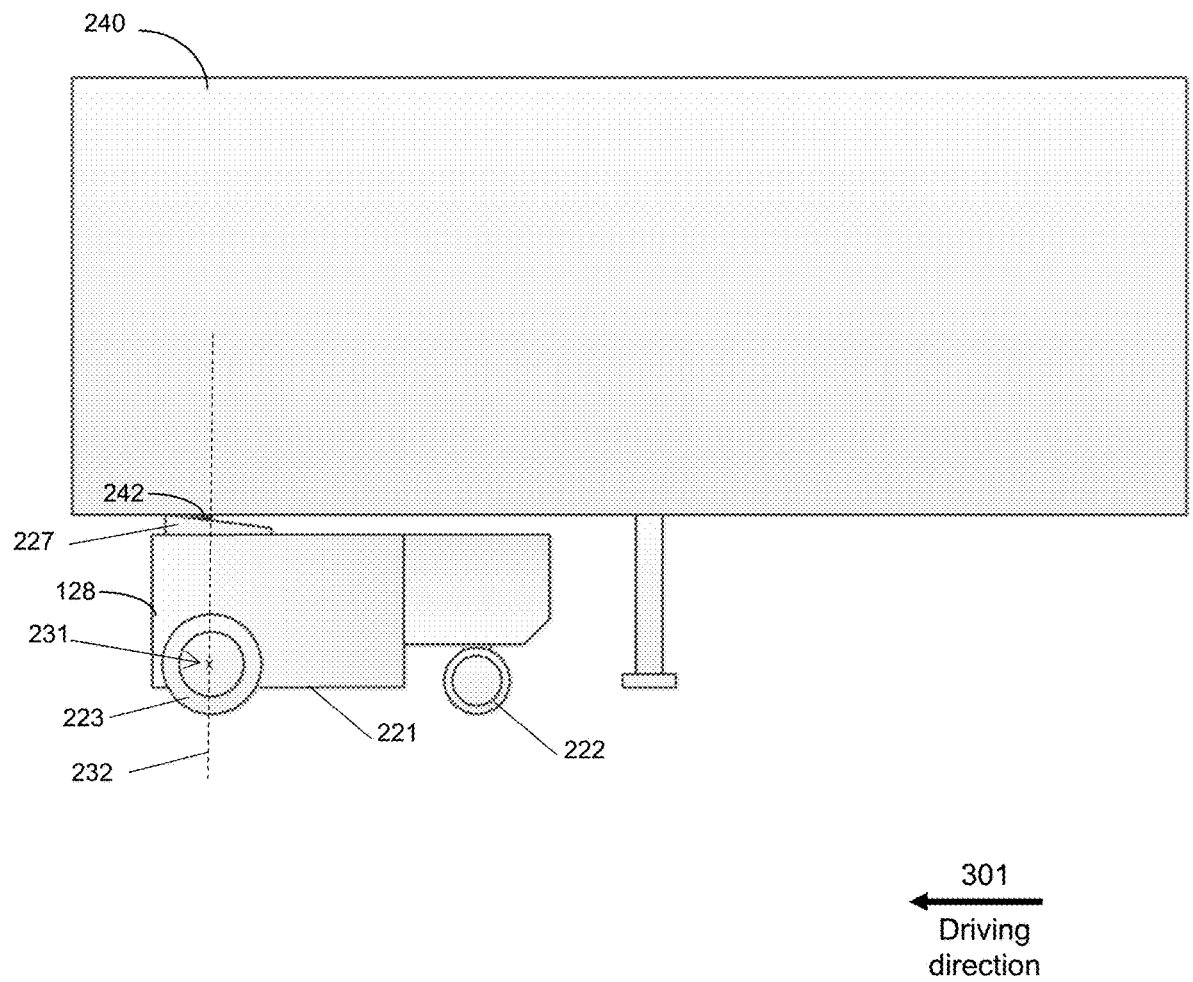
FIGS. 3A and 3B illustrate side views of the autonomous yard vehicle coupled with a trailer according to various embodiments of the present disclosure.
Figure 3B:
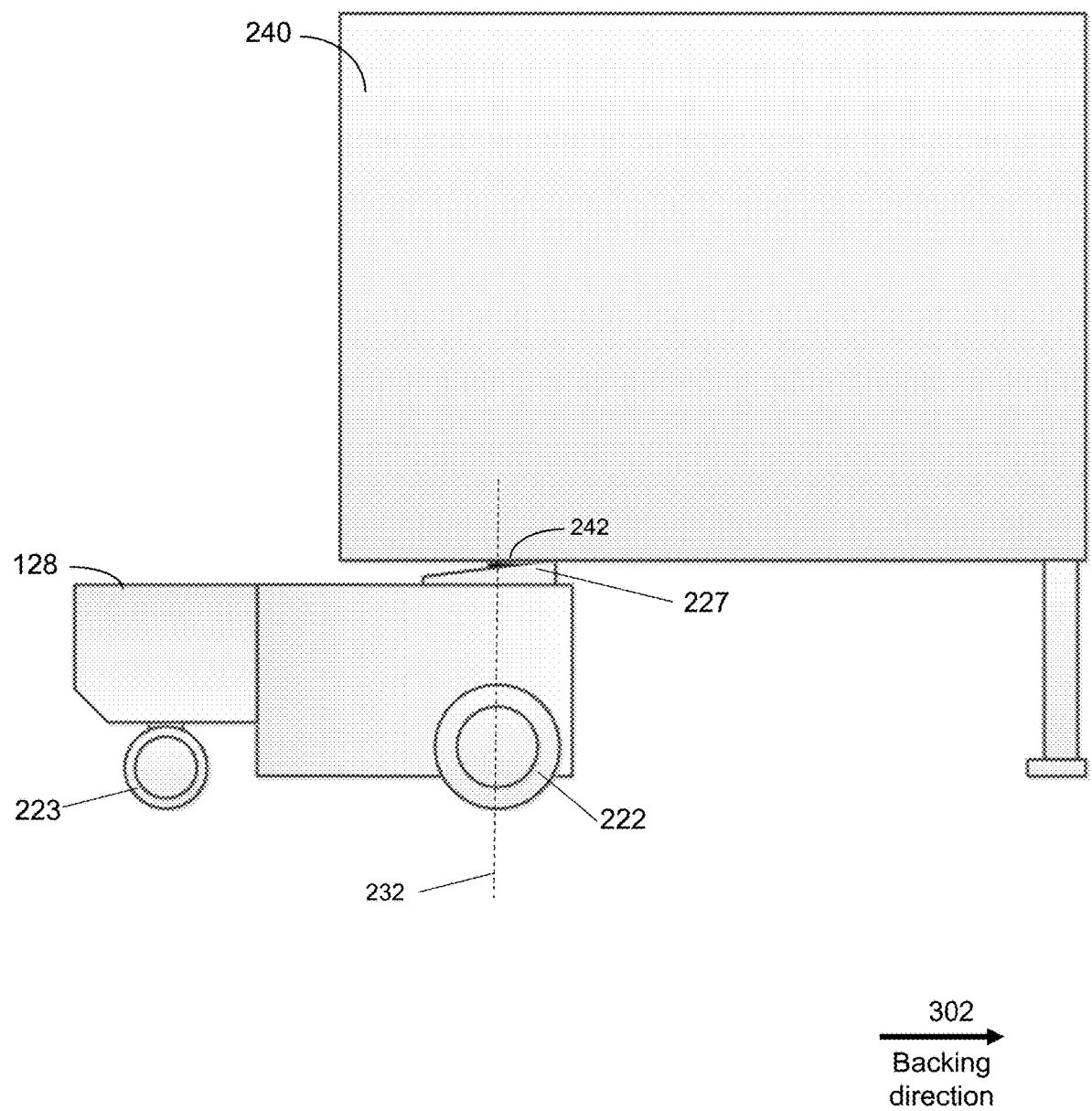

FIGS. 3A and 3B illustrate side view of the autonomous yard vehicle 128 that is coupled with a cargo trailer 240 according to various embodiments of the present disclosure.

As shown in FIG. 3A, the autonomous yard vehicle 128 is coupled with a cargo trailer 240 and driving forward in the direction shown as the arrow 301, and in FIG. 3B the autonomous yard vehicle 128 is coupled with the cargo trailer 240 and backing up in the direction shown as the arrow 302. Thus, the freely rotating wheel 222 trails the first and second drive wheels 223, 224 when the cargo trailer 240 is being pulled or pushed. Therefore, the freely rotating wheel 222, i.e., the caster, can stabilize the autonomous vehicle and the coupled trailer when the vehicle is driving.

In one embodiment, when a cargo trailer in the distribution center needs to be moved to a particular location, such as a door or a dock, an instruction to move the trailer can be sent to the computing device 230 coupled to the autonomous yard vehicle 128. In response to receiving the instruction, the computing device 230 can generate a route of navigating the autonomous yard vehicle 128 to the location of the cargo trailer 240 according to a map of the distribution center indicating the locations of the autonomous yard vehicle 128 and the cargo trailer 240. The route is also generated according to detection results from the sensors which indicate objects around the autonomous yard vehicle 128. In some embodiments the computing device can implement a simultaneous localization and mapping (SLAM) algorithm to generate a map of the environment and to maintain a location of the autonomous yard vehicle in the environment.

When the autonomous yard vehicle 128 is located in a proximity to the cargo trailer, the autonomous yard vehicle 128 identifies whether the cargo trailer is the correct trailer that needs to be coupled according to the instruction. The autonomous vehicle can identify the trailer by reading a barcode associated with the trailer using a barcode reader, extracting text from an image including a trailer number using an image capture device, and reading an RFID affixed to the trailer using a RFID reader, etc. If the trailer is the correct trailer, the computing device 230 can guide the slot of the coupling 227 to receive the kingpin 242 of the cargo trailer 240. The object avoidance sensors 232 can detect the position of the chassis 221 relative to the cargo trailer 240. Based on the detected position, the autonomous yard vehicle 128 can compute a distance between the coupling 227 and the kingpin 242 using the detected position of the cargo trailer, and can generate a route of moving the autonomous yard vehicle 128 to facilitate mechanical coupling between the slot of the coupling 227 and the kingpin 242.

Figure 3C:
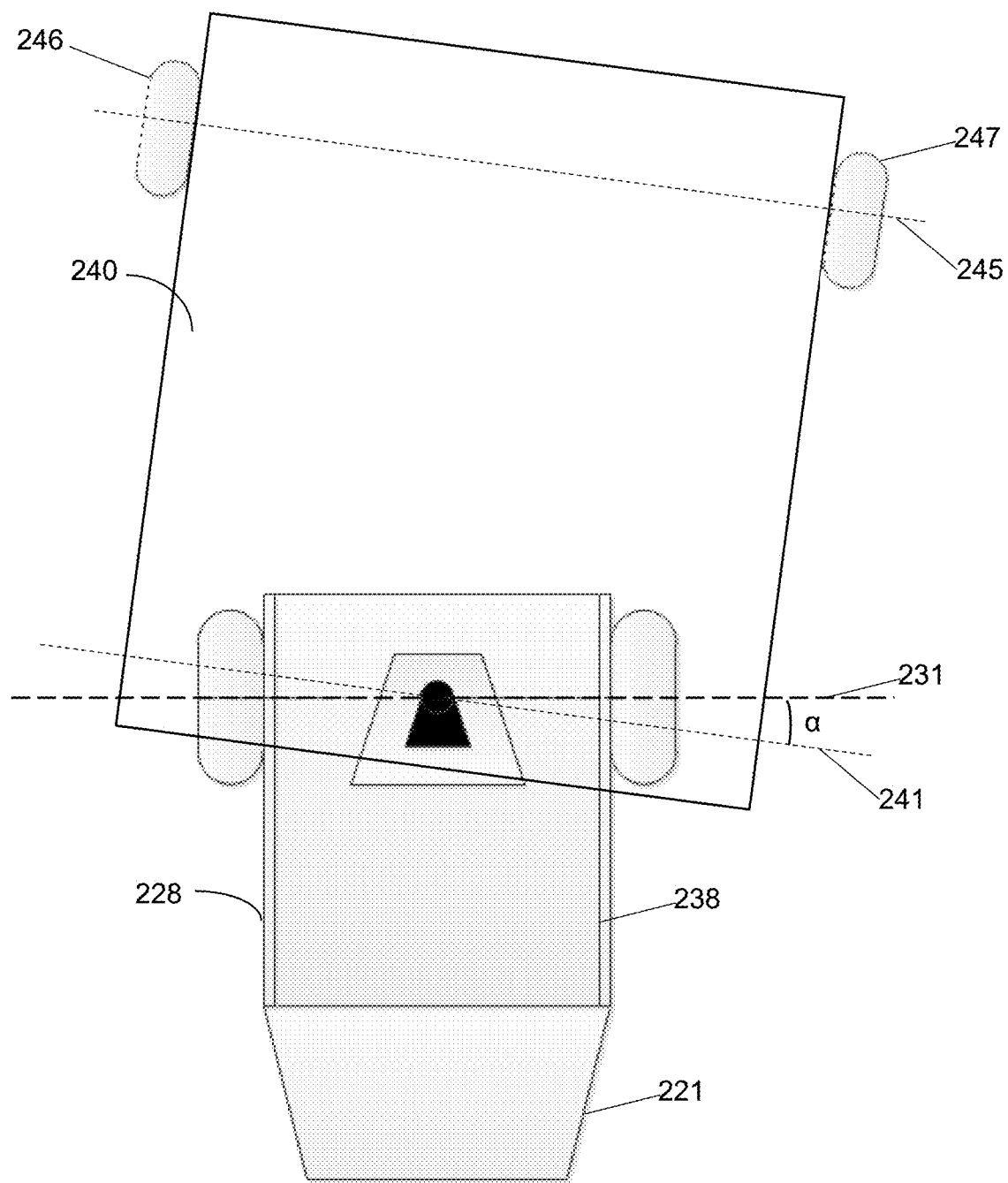
FIG. 3C illustrates a top view of the autonomous yard vehicle coupled with the trailer according to various embodiments of the present disclosure

After mechanically coupling the kingpin to the slot, the cargo trailer 240 can be autonomously navigated by the autonomous yard vehicle 128 to a dock or a door for unloading freight from the cargo trailer or loading freight onto the cargo trailer. The first and second drive wheels 223, 224 of the autonomous yard vehicle can be independently driven by the first and second motors 225, 226 to rotate or pivot the chassis 221 about a second axis of rotation 232 as shown in FIGS. 3A and 3B. The second axis of rotation 232 perpendicularly intersects the first axis of rotation 231, and the kingpin 242 extends along the second axis of rotation 232, where the first axis of rotation 231 and the second axis of rotation 242 reside in a common vertical plane (i.e. at an angle normal to the earth). Therefore, when the trailer is coupled with the autonomous yard vehicle, the kingpin of the trailer is aligned with and vertically offset from the first axis of rotation 231. Aligning the first and second axes of rotation 231, 232, respectively, as described herein advantageously enables the trailer coupled to the autonomous yard vehicle to have a smaller turning radius than when the axes are out of alignment, which can be beneficial in navigating tight and/or crowded environment FIG. 3C illustrates a schematic diagram of top view of the autonomous yard vehicle 128 coupled with the cargo trailer 240 according to various embodiments of the present disclosure. When the autonomous yard vehicle 128 coupled with the trailer 240 is driving, for example, moving straight or turning around other objects, the autonomous yard vehicle 128 can generate a route of travel based on the angle between the chassis 221 of the autonomous yard vehicle 128 and the trailer 240, i.e., angle α in FIG. 3C.

Angle α, as shown in FIG. 3C, is formed by the first axis of rotation 231 of the vehicle 128 and direction 241 that is parallel with an axis of rotation 245 which the wheels 246, 247 of the trailer 240 are aligned about. Therefore, angle α represents the angle between the autonomous vehicle 128 and the trailer 240. The angle α between the autonomous yard vehicle 128 and the trailer 240 can be determined by the vehicle 128 based on the position of the chassis 221 relative to the trailer 240 detected by the trailer angle sensors 238. The trailer angle sensors 238 can be disposed along one or both sides of the chassis 221 and include infrared (IR) reflective-type sensors. The infrared (IR) sensors emit infrared beams vertically in a direction parallel to the second axis of rotation 232, such that based on the infrared beams reflected by the bottom of the cargo trailer 240 and detected by the IR sensors, the angle of the chassis 221 relative to the cargo trailer 240 can be determined. Based on this angle between the chassis and the trailer, the autonomous yard vehicle 128 can generate a route of travel when the kingpin 242 is mechanically coupled to the slot of the coupling 227 and/or can determine whether a current turning radius of the autonomous yard vehicle is unsafe at a given speed.

Figure 4:
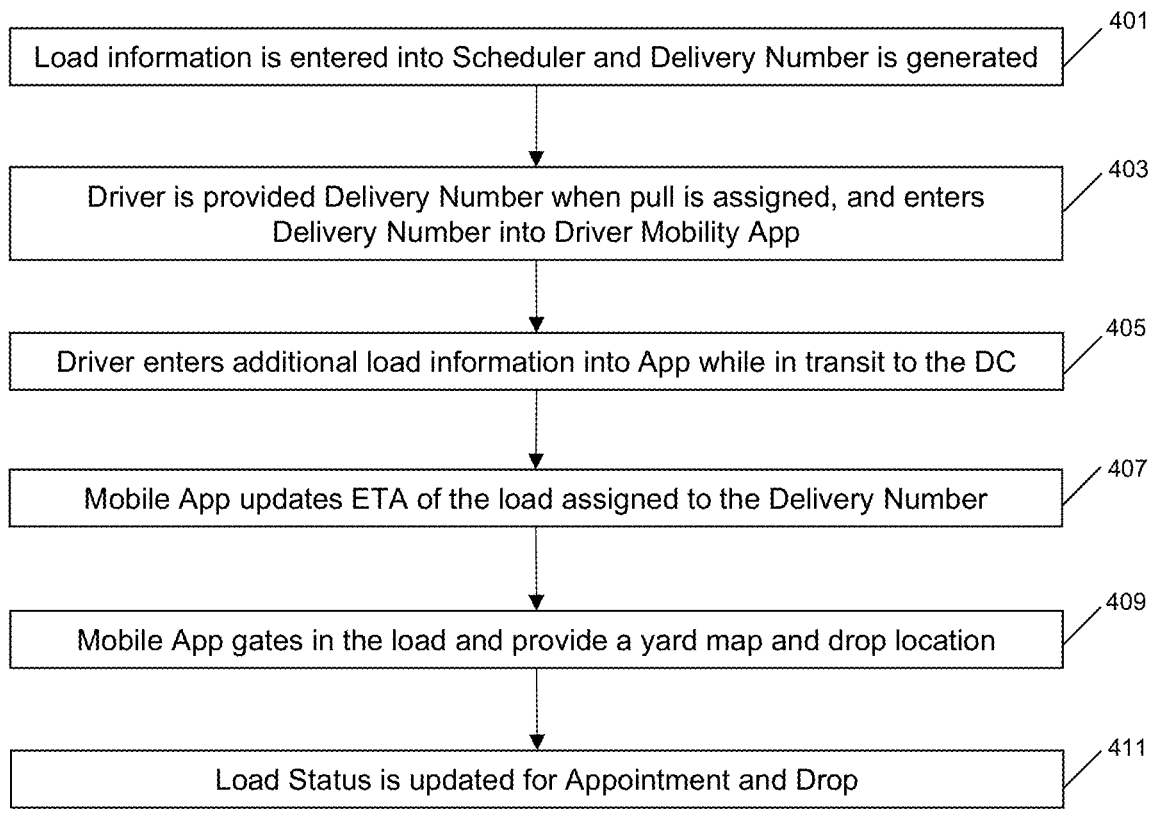
FIG. 4 is a flow diagram illustrating a gate-in process performed by the yard management system according to various embodiments of the present disclosure.

FIG. 4 is a flow diagram illustrating a gate-in process performed by the yard management system in a distribution center according to an exemplary embodiment of the present disclosure. When a delivery task is generated, at step 401, the freight carrier can generate a delivery number for each freight delivery, and enter load information of the freight into a scheduler. The scheduler can be a database holding load information related to the freight destined for the distribution center. The load information includes a delivery number and additional load information related to the driver delivering the cargo trailer to the distribution center, the vehicle transporting the cargo trailer, the freight-type associated with each of the plurality of loads, and estimated time of arrival, etc.

FIG. 5 is a graphical user interface (GUI) of a database for uploading load information according to an exemplary embodiment of the present disclosure. The freight carrier can upload the load information in the database, such as a scheduler. The load information includes purchase order (PO) number in Column A, progressive number (PRO) in Column B, bill of lading (BOL) number in Column C, pickup date in Column D, case quantity of the freight in Column E, freight weight in Column F, original state of the freight in Column G, original country of the freight in Column H, payment type in Column I, freight unitization in Column J, and free astray value in Column K, etc. For example, Row 2 of the chart indicates that the PO number of this load is 6085535991, the pickup date is Sep. 19, 2016, the quantity of cases is 2746, the weight of the freight is 35178 lb, the freight is from Illinois, U.S., payment type is collect, the freight load is unitized as pallets, and the amount of free astray is 0. A delivery number can be generated and stored in the scheduler for each freight load.

Referring back to FIG. 4, at step 403, when a pull or delivery task is assigned, the driver is provided with the corresponding delivery number. For example, a paper bill of lading (BOL) can be provided to the driver. After the driver launches the yard management mobile app and logs into his/her account on the mobile device, the driver can enter the delivery number or the purchase order (PO) number(s) from the paper bill of lading (BOL). Alternatively, the driver can use the smartphone to photograph the delivery number or the PO numbers from the paper bill of lading.

At step 405, the driver can enter additional load information into the mobile app while in transit to the distribution center. The additional information can include trailer number, Standard Carrier Alpha Code (SCAC) that represents the carrier, seal number, freight type, door type in the distribution center, whether the load contains meat, PO numbers, etc. The driver can check the load information uploaded in the schedule by the carrier, and correct the inaccurate information if needed. Furthermore, the driver can obtain pallet information by using the mobile device to capture images of each pallet or scanning pallet labels, and the yard management system can verify the pallet information based on the captured or scanned images of the pallets during the gate-in or gate-out process. The yard management system can generate a barcode corresponding to each freight load. The barcode can be presented by the mobile app.

At step 407, the mobile application updates the estimated time of arrival (ETA) according to updated load information acquired at step 405. The estimated time of arrival (ETA) can be transmitted to both the driver's mobile device and the distribution center. The distribution center can directly communicate with the drivers and update the load status.

At step 409, when the driver approaches the gate of the DC, i.e., the mobile device associated with the user is within a geo-fenced zone associated with the distribution center based on a GPS location signal received by the computing system from the mobile device, the yard management system can transmit the load information and load status to a client device associated with the distribution center, for example, a computing device associated with a gate associate or an asset protection (AP) associate of the DC. The gate associate can scan the barcode presented on the driver's mobile device to obtain the information without manually enter the load information during the gate-in process. The yard management system can provide the driver with a yard map and drop location indicated by the yard map.

At step 411, the yard management system can update the load status and transmit the updated load status to the driver's mobile device. For example, if the load is an appointment, during the period that the freight is loaded onto the trailer, the driver will be updated on the load status via their smartphone. If the load is a drop, after the freight is unloaded at the distribution center, the driver can call their dispatch for a new freight delivery.

Figure 6:
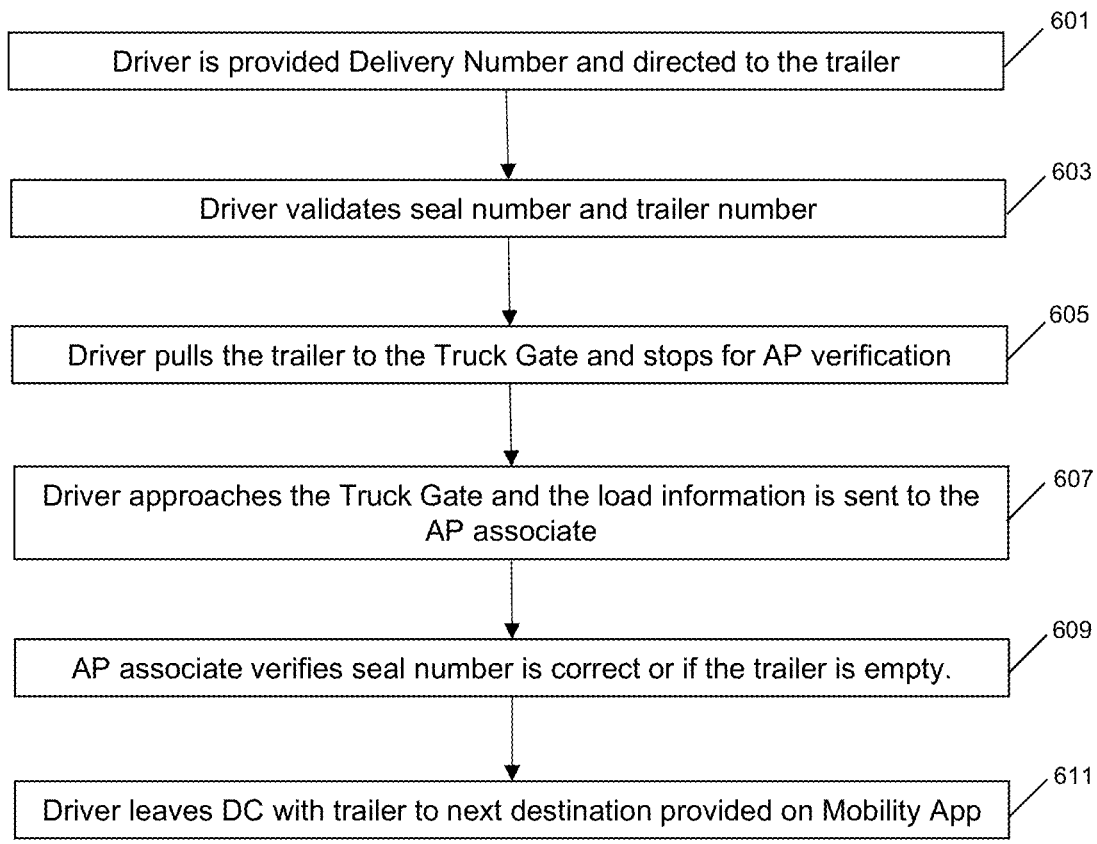
FIG. 6 is a flow diagram illustrating a gate-out process performed by the yard management system according to various embodiments of the present disclosure.

FIG. 6 is a flow diagram illustrating a gate-out process performed by the yard management system in a distribution center according to various embodiments of the present disclosure. In the distribution center, if the load is an appointment, the freight will be loaded onto the trailer, and if the load is a drop, the freight will be unloaded from the trailer at the distribution center. After the freight is loaded or unloaded, the gate-out process is needed before the driver leaves the distribution center.

At step 601, the driver is provided with the delivery number of the load after the freight is loaded or unloaded. The load information can be populated into the mobile application, and the driver can be directed to the location of the trailer by the mobile app. For example, the mobile app can present a yard map indicating the location of the trailer.

At step 603, the driver verifies the trailer by validating seal number and trailer number associated with the delivery number. Then at step 605 the driver pulls the trailer to the truck gate of the distribution center and stops for the asset protection (AP) associate verification. At step 607, as the driver approaches the truck gate, the load information is sent to the asset protection (AP) associate. Then at step 609 the asset protection (AP) associate verifies whether the seal number is correct. If the load is a drop, the AP associate verifies whether the trailer is empty. At step 611, the driver leaves the distribution center with trailer. If a new delivery has been scheduled, the mobile application can provide the driver with a new destination.

Figure 7:
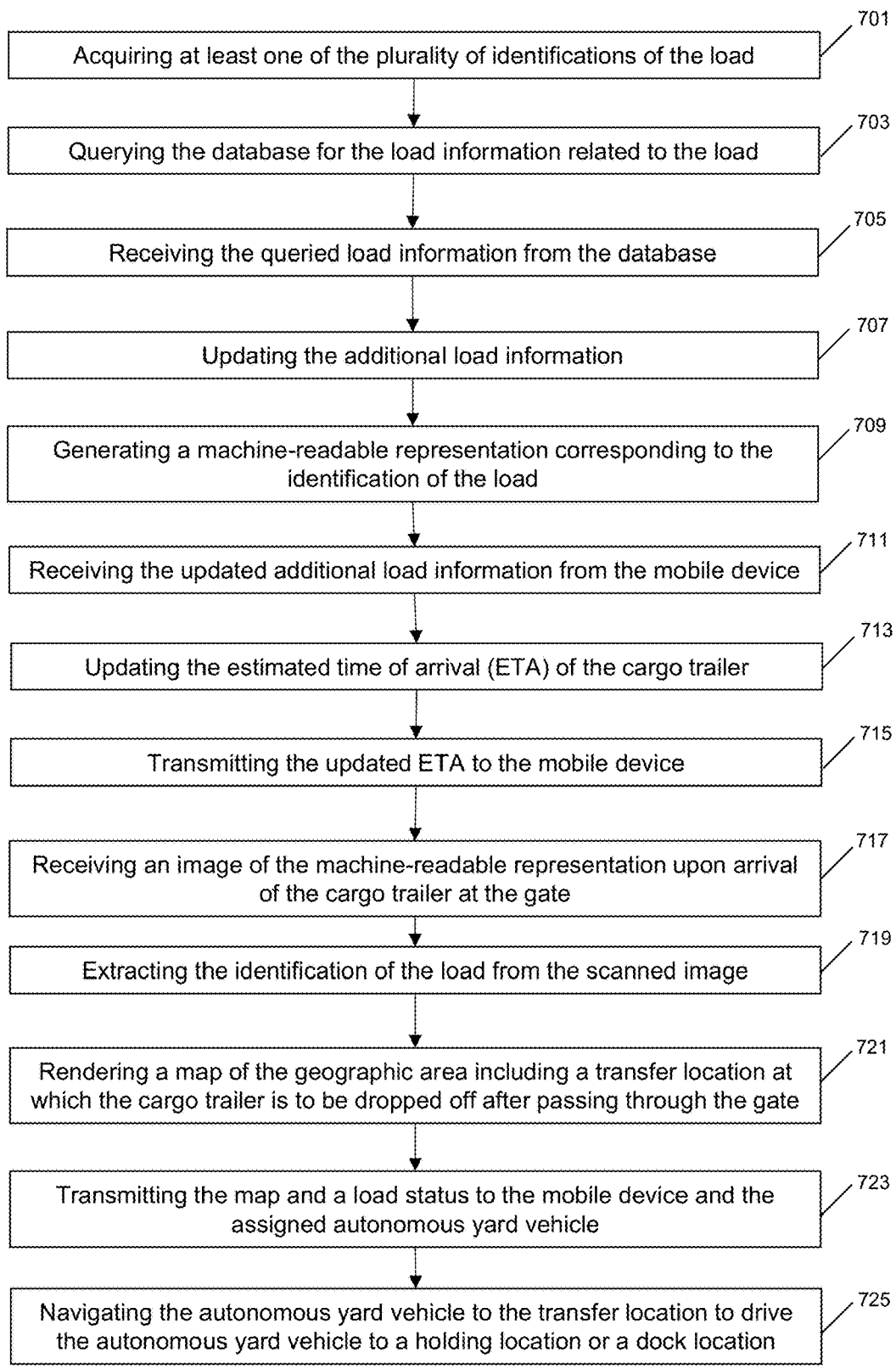
FIG. 7 is a flow diagram illustrating a method performed by the yard management system according to various embodiments of the present disclosure.

FIG. 7 is a flow diagram illustrating a method performed by the yard management system for assigning autonomous vehicles according to various embodiments of the present disclosure. In a distribution center, the yard management system can assign and direct the autonomous yard vehicles, for example, autonomous tractors, to move cargo trailers in the yard. The system can assign the autonomous tractors to the trailers and designate destinations (e.g., loading docks, parking areas) of the trailers to be moved based upon the load information acquired during the gate-in process and assignment rules.

After the load information is entered into a database, such as a scheduler, by the freight carrier, at step 701 a mobile application, which is executable on a mobile device and associated with a user account of the driver, acquires the identifications of the freight load. The identifications of the load include, for example, a delivery number, a load number, a purchase order (PO) number, and a bill of lading (BOL) number. The driver can enter the delivery number into the mobile app by inputting the delivery number or taking a picture of the delivery number that can be identified by the mobile app.

At step 703, the mobile app queries the scheduler, with the acquired delivery number, for the load information of the load related to the delivery number. At step 705 the mobile app receives the queried load information from the scheduler, and then updates the additional load information based on information of load documentation at step 707. The additional load information can be entered by the driver. At step 709 the mobile app generates a machine-readable representation corresponding to the delivery number, such as a barcode.

A computing system of the yard management system communicates with the mobile device, the scheduler, and the autonomous yard vehicle. At step 711 the computing system receives the updated additional load information of the loads from the mobile device, and the estimated time of arrival (ETA) of the cargo trailer is updated based on the updated additional load information at step 713. The updated ETA is transmitted to the mobile device associated with the user account at step 715.

At step 717 the computing system receives, from a client device at a gate of the distribution center, an image of the machine-readable representation scanned from the mobile device by the client device upon arrival of the cargo trailer at the gate. For example, when the driver arrives the gate of the distribution center, the driver can present the barcode corresponding to the freight load on his/her mobile device, then the asset protection (AP) associate at the distribution center can use a barcode reader to scan the barcode, and the image of the scanned barcode can be transmitted to the computing system.

At step 719 the computing system extracts the delivery number of the freight load from the scanned image. At step 721, based on the load information related to the extracted delivery number, the computing system assigns an autonomous vehicle to move the cargo trailer and renders a map of the yard at the distribution center. The yard map includes a transfer location at which the cargo trailer is to be dropped off after passing through the gate. At step 723 the computing system transmits the yard map and a load status to the mobile device associated with the user account. The yard map and the load status are also transmitted to the assigned autonomous yard vehicle.

The assigned autonomous yard vehicle includes a first coupling component configured to mechanically couple with a second coupling component of the cargo trailer. The first coupling component of the autonomous yard vehicle can be a female connector, such as a slot, and the second coupling component of the cargo trailer can be a male connector, such as a kingpin. In step 725, in response to detecting the mobile device at the transfer location, the autonomous yard vehicle navigates to the transfer location based on the map to facilitate mechanical coupling of the autonomous yard vehicle and the cargo trailer and to drive the autonomous yard vehicle to a holding location or a dock location based on the loads in the cargo trailer.

Figure 8A:
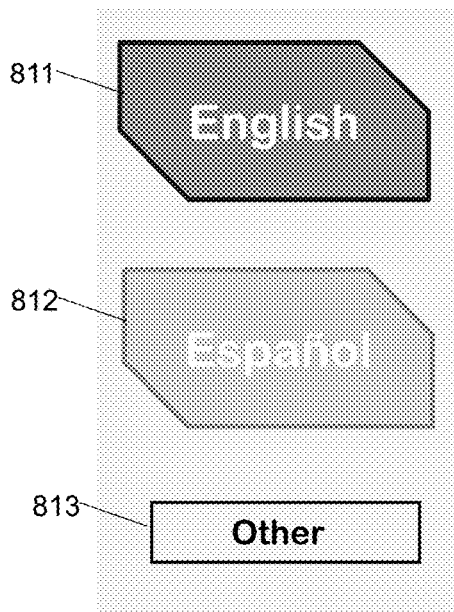
FIGS. 8A-8N are graphical user interfaces (GUIs) of a mobile application of the yard management system according to an exemplary embodiment of the present disclosure.
Figure 8B:
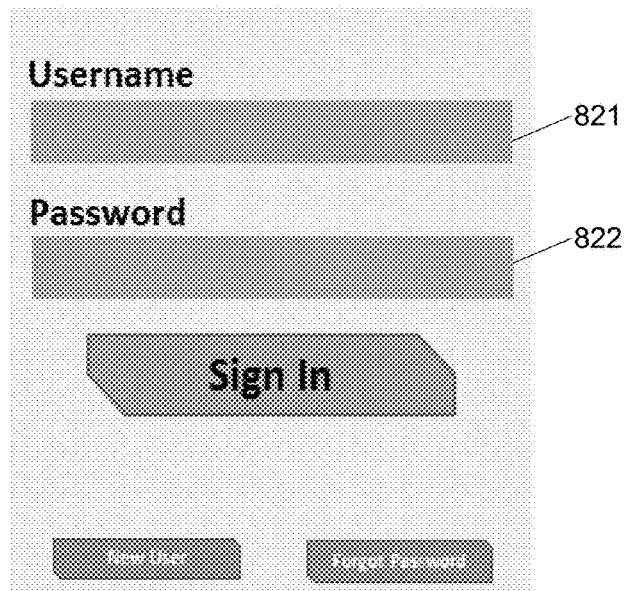
Figure 8C:
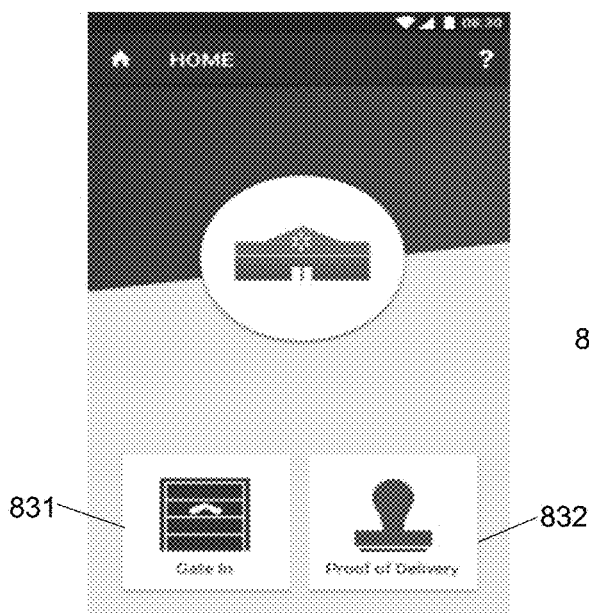
Figure 8D:
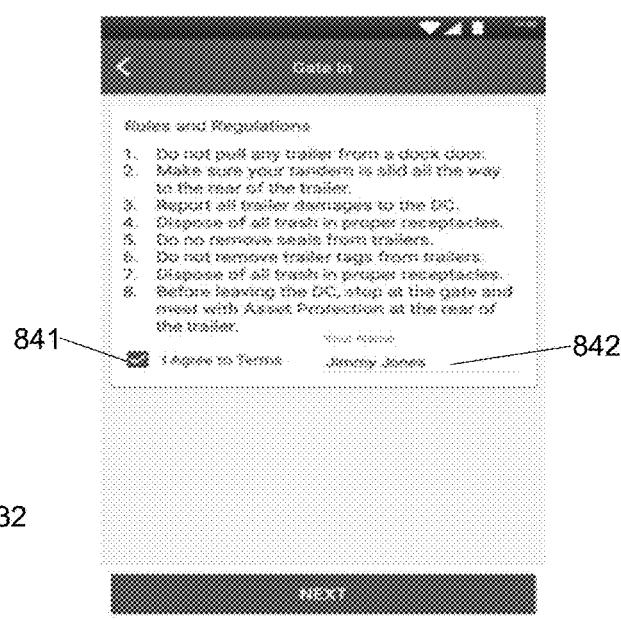
Figure 8E:
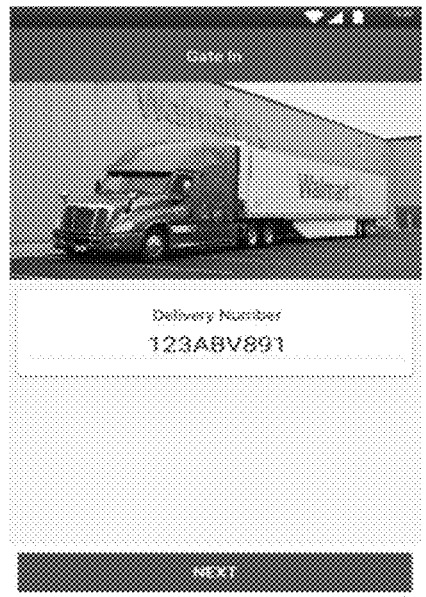
Figure 8F:
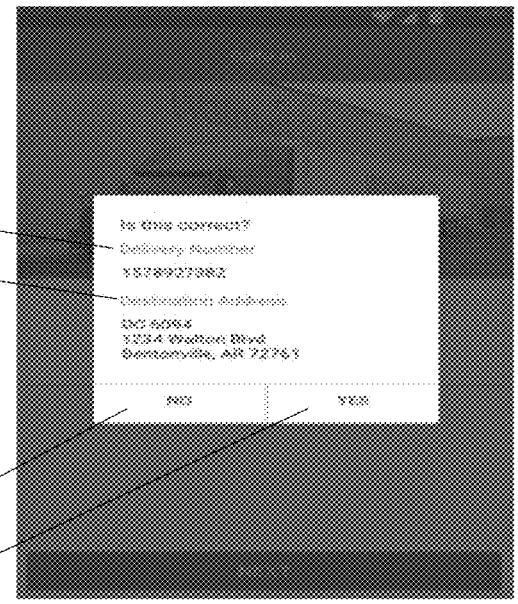
Figure 8G:
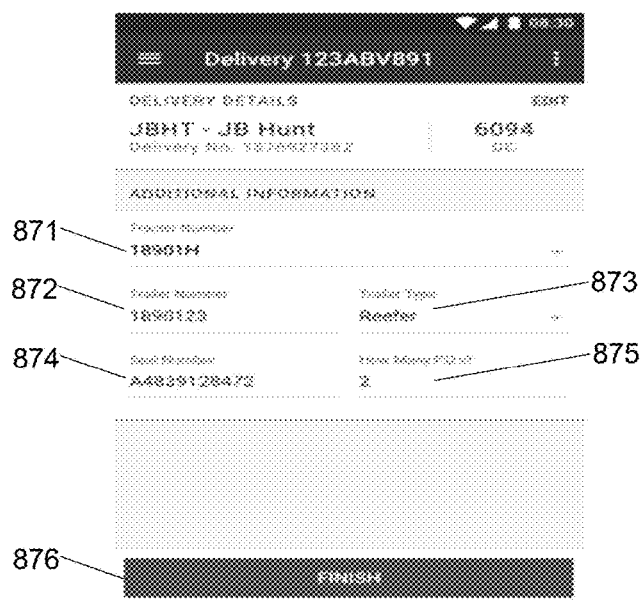
Figure 8H:
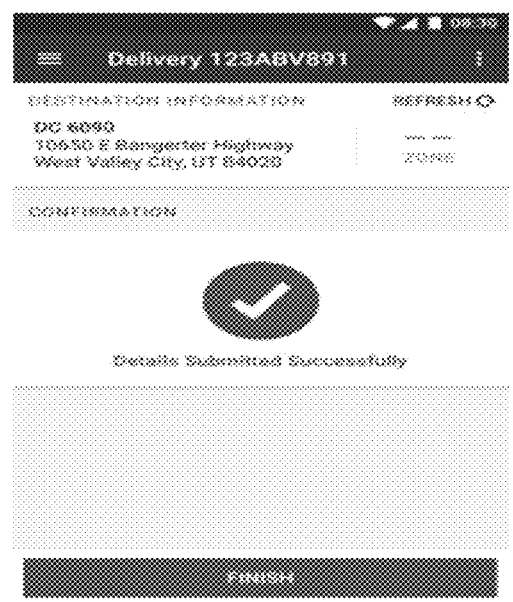
Figures 8I, 8J:
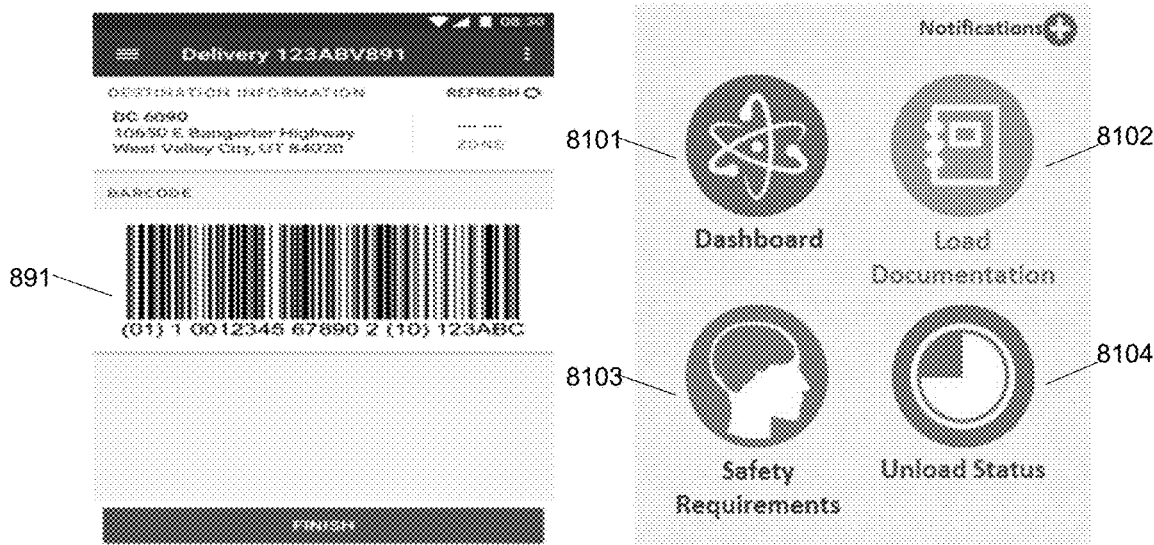
Figures 8K, 8L:
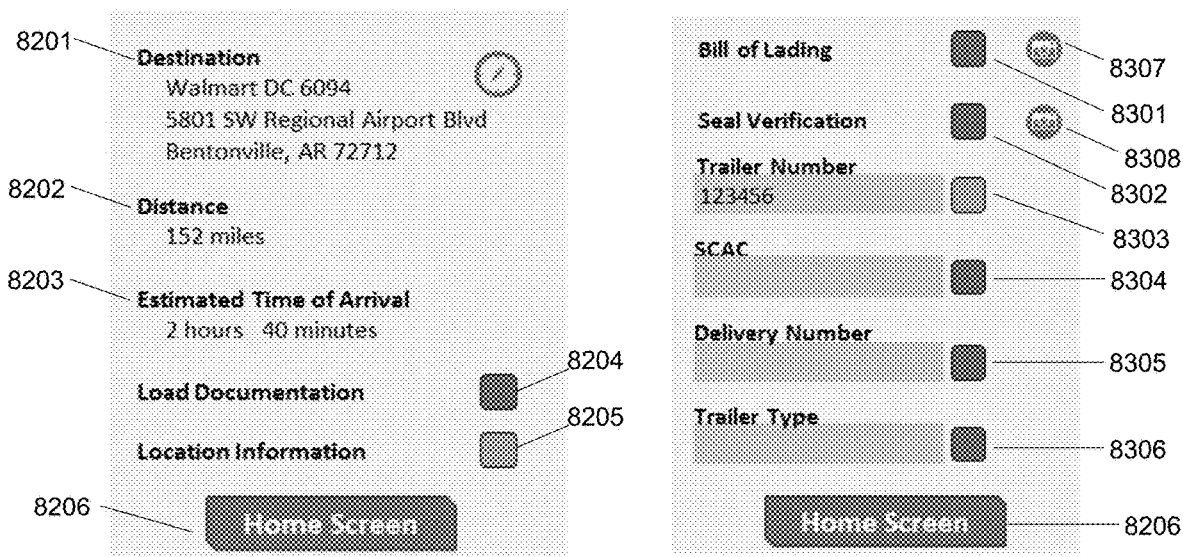
Figures 8M, 8N:
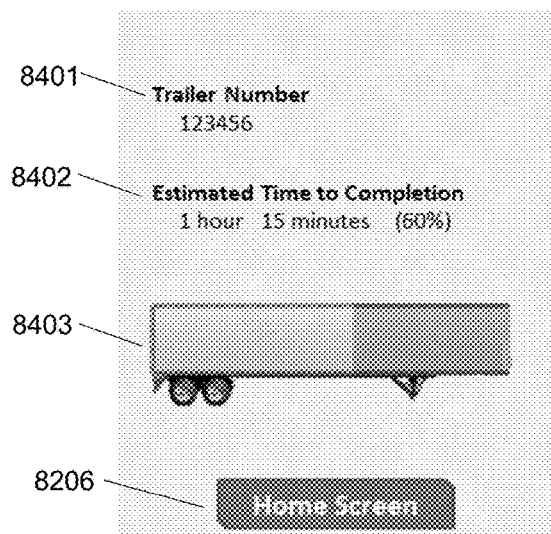

FIGS. 8A-8N are exemplary graphical user interfaces (GUIs) of a mobile application executed on a mobile device of the yard management system according to the present disclosure. As shown in FIG. 8A, after the user or the driver launches the mobile application, the user can select the language of the app, for example, English 811, Spanish 812, or other language 813. After selecting the preferred language, as shown in FIG. 8B, the user can log in his/her account by entering the username 821 and the password 822. After logging in, the user can select gate-in process 831 or proof of delivery process 832 shown in FIG. 8C according to the next workflow step. When the user selects gate-in process 831, FIG. 8D shows a GUI of acknowledgement of rules and regulations. By selecting the checkbox 841 and entering the user's name at name box 842, the user acknowledges and agrees to the rules and regulations shown on the GUI screen in FIG. 8D. Therefore, the yard management system transmits safety requirement to the mobile device and tracks safety review of the user associated with the mobile device.

Then as shown in FIG. 8E, the user can enter and submit delivery number or load number provided by the freight carrier. Alternatively, the user can use the smartphone to photograph the delivery number or load number from the paper bill of lading (BOL) provided by the freight carrier. According to the delivery number submitted by the user, the mobile app can acquire the load information related to the delivery number from databases provided by the freight carrier. The acquired load information is presented on the GUI screen in FIG. 8F, and the user can confirm whether the presented information is correct. For example, as shown in FIG. 8F, the acquired load information includes delivery number 861 and destination address of the shipment 862. If the load information is not correct, the user can click "NO" button 863, and the mobile app may goes back to the GUI in FIG. 8E where the user can enter another delivery number. If the user confirms that the presented load information is correct, the user may click "YES" button 864, and then in the GUI shown in FIG. 8G, additional load information can be acquired from the database provided by the freight carrier. Alternatively, the additional load information can be entered by the user. As shown in FIG. 8G, the additional load information includes, for example, tractor number or yard vehicle number 871, trailer number 872, trailer type 873, seal number 874, and the number of purchase orders 875. The user can click the "FINISH" button 876 to confirm that the additional load information is correct. Then as shown in FIG. 8H, a delivery request to the receiving distribution center (DC) can be generated. In FIG. 8I, a barcode 891 corresponding to the delivery number 861 can be generated and presented on the GUI screen. Upon arrival at the DC destination, the asset protection (AP) associate at the DC gate can simply scan the barcode 891 to obtain the load information without manually enter the load information during the gate-in process, which can greatly speed the processes for delivery.

After the yard management system acquires the load information related to the delivery number, the user can receive updated status information of the related freight load using the mobile application. FIG. 8J shows the GUI of home screen related to the freight load. If the user select "Dashboard" button 8101, the mobile app goes to the GUI shown in FIG. 8K, which presents the load information related to the delivery number. The load information includes, for example, delivery destination 8201, delivery distance 8202, and estimated time of arrival 8203 that indicates when the delivery is expected to arrive at the distribution center (DC). The estimated time of arrival 8203 can be updated in real-time according to the location of the driver.

In the GUI of FIG. 8K, different colors of icon 8204 can be used to indicate lacking of the load documentation based on the load information received from the database, i.e., whether the load documentation is complete. For example, if the load documentation has been completely uploaded in the yard management system, the color of icon 8204 is green, and if the load documentation is not complete, the color of icon 8204 is red. Similarly, different colors of icon 8205 can be used to indicate whether the location information of distribution center is complete. The user can click the "Home screen" button 8206 to return to the GUI in FIG. 8J.

When the user select "Load Documentation" button 8102 in FIG. 8J, the mobile app goes to the GUI shown in FIG. 8L. Different colors of icons 8301-8306 can be used to indicate the upload status of bill of lading, seal verification, trailer number, Standard Carrier Alpha Code (SCAC), delivery number, and trailer type, respectively. Furthermore, the user can click the button 8307 to upload the bill of lading using an image capture device, such as a camera on the user's mobile device. Similarly, the user can click the button 8308 to upload the seal verification using an image capture device.

When the user select "Safety Requirements" button 8103 in FIG. 8J, the mobile app goes to the GUI shown in FIG. 8D which presents the rules and regulations.

If the freight load is a drop, i.e., the driver is delivering freight to the distribution center, after the driver drops the trailer in the distribution center, the user can select "Unload Status" button 8104 in FIG. 8J to check the real-time unload status. FIG. 8M shows a GUI that presents the real-time unload status. The unload status includes, for example, trailer number 8401, estimated time to completion 8402 that indicates when the unload delivery is expected to be complete, and a progress bar 8403 that shows the percentage of completion of unloading using different colors. In another embodiment, if the freight load is an appointment, i.e., the driver is loading freight from the distribution center, the yard management system can also provide real-time load status by the mobile app.

Furthermore, the mobile app can push notification to freight carrier when loading or unloading is complete. As shown in FIG. 8N, the notification includes the updated real-time status of the loading or unloading at different time. For example, in row 8401, the status indicates that on Nov. 16, 2016 the trailer with the trailer number 123456 successfully gated at DC 6094 at 10:35. Row 8402 shows that the trailer 123456 docked at receiving door at 10:50. And rows 8403-8405 also indicate the status of the trailer 123456 at different time during the unloading process, and the last row 8406 indicates that the trailer is read for pickup at door 225 at 13:45.

Figure 9:
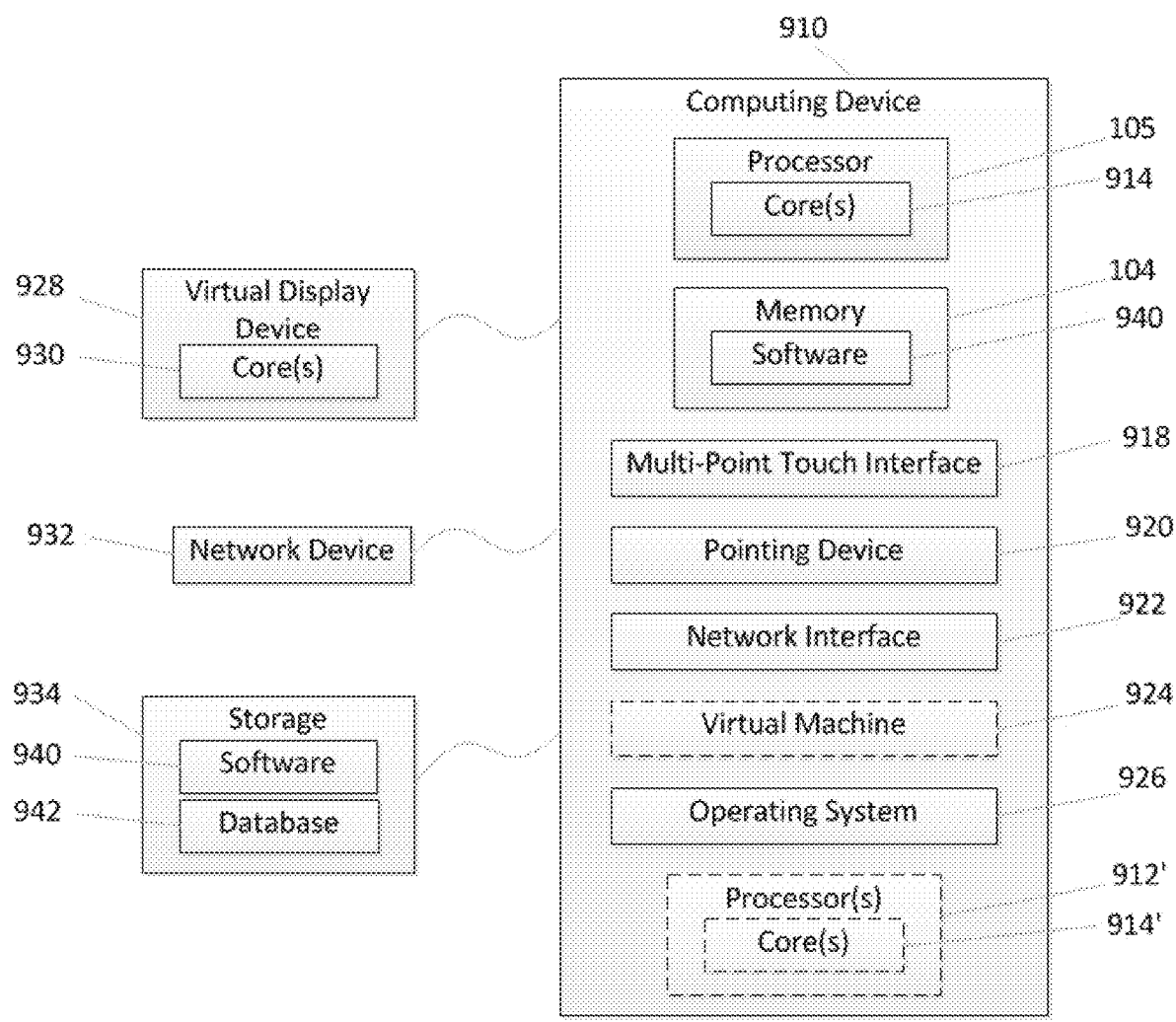
FIG. 9 is a block diagram of an exemplary computational device with various components which can be used to implement various embodiments.

FIG. 9 is a block diagram of an exemplary computing device 910 such as can be used, or portions thereof, in accordance with various embodiments and, for clarity, refers back to and provides greater detail regarding various elements of the system 100 of FIG. 1. The computing device 910, which can be, but is not limited to the central computing system, the server, user mobile device, POS device and data capture devices described herein, can include one or more non-transitory computer-readable media for storing one or more computer-executable instructions or software for implementing exemplary embodiments. The non-transitory computer-readable media can include, but is not limited to, one or more types of hardware memory, non-transitory tangible media (for example, one or more magnetic storage disks, one or more optical disks, one or more flash drives), and the like. For example, memory 104 included in the computing device 910 can store computer-readable and computer-executable instructions or software for performing the operations disclosed herein. For example, the memory 104 can store a software application 940 which is configured to perform the disclosed operations (e.g., manage yard vehicles in a distribution center). The computing device 910 can also include configurable and/or programmable processor 105 and an associated core 914, and optionally, one or more additional configurable and/or programmable processing devices, e.g., processor(s) 912' and associated core(s) 914' (for example, in the case of computational devices having multiple processors/cores), for executing computer-readable and computer-executable instructions or software stored in the memory 104 and other programs for controlling system hardware. Processor 105 and processor(s) 912' can each be a single core processor or multiple core (914 and 914') processor.

Virtualization can be employed in the computing device 910 so that infrastructure and resources in the computing device can be shared dynamically. A virtual machine 924 can be provided to handle a process running on multiple processors so that the process appears to be using only one computing resource rather than multiple computing resources. Multiple virtual machines can also be used with one processor.

Memory 104 can include a computational device memory or random access memory, such as DRAM, SRAM, EDO RAM, and the like. Memory 104 can include other types of memory as well, or combinations thereof.

A user can interact with the computing device 910 through a visual display device 928, such as any suitable device capable of rendering texts, graphics, and/or images including an LCD display, a plasma display, projected image (e.g. from a Pico projector), Google Glass, Oculus Rift, HoloLens, and the like, and which can display one or more user interfaces 930 that can be provided in accordance with exemplary embodiments. The computing device 910 can include other I/O devices for receiving input from a user, for example, a keyboard or any suitable multi-point touch (or gesture) interface 918, a pointing device 920 (e.g., a mouse). The keyboard 918 and the pointing device 920 can be coupled to the visual display device 928. The computing device 910 can include other suitable conventional I/O peripherals.

The computing device 910 can also include one or more storage devices 934, such as a hard-drive, CD-ROM, flash drive, or other computer readable media, for storing data and computer-readable instructions and/or software that perform operations disclosed herein. In some embodiments, the one or more storage devices 934 can be detachably coupled to the computing device 910. Exemplary storage device 934 can also store one or more software applications 940 for implementing processes of the yard management system described herein and can include databases 942 for storing any suitable information required to implement exemplary embodiments. The databases can be updated manually or automatically at any suitable time to add, delete, and/or update one or more items in the databases. In some embodiments, at least one of the storage device 934 can be remote from the computing device (e.g., accessible through a communication network) and can be, for example, part of a cloud-based storage solution.

The computing device 910 can include a network interface 922 configured to interface via one or more network devices 932 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 922 can include a built-in network adapter, network interface card, PCMCIA network card, card bus network adapter, wireless network adapter, USB network adapter, modem or any other device suitable for interfacing the computing device 910 to any type of network capable of communication and performing the operations described herein. Moreover, the computing device 910 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 910 can run operating systems 926, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 926 can be run in native mode or emulated mode. In an exemplary embodiment, the operating system 926 can be run on one or more cloud machine instances.

Figure 10:
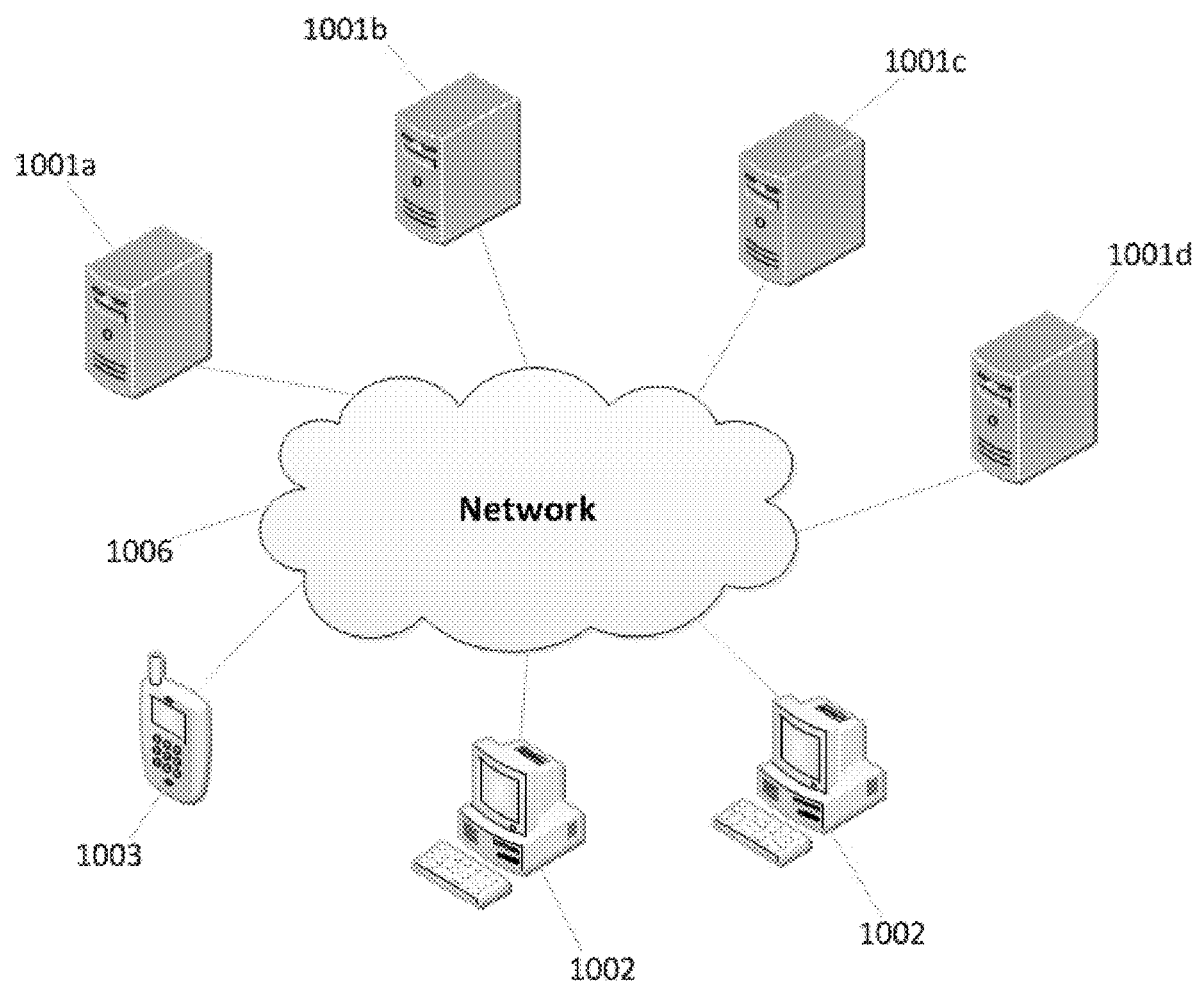
FIG. 10 is block diagram of an exemplary distributed system suitable for use in exemplary embodiments.

FIG. 10 is a block diagram of exemplary distributed and/or cloud-based embodiments. Although FIG. 1, and portions of the exemplary discussion above, make reference to a yard management system 100 operating on a single computing device, one will recognize that various of the modules within the yard management system 100 may instead be distributed across a network 1006 in separate server systems 1001a-d and/or in other computing devices, such as a desktop computer device 1002, or mobile computer device 1003. As another example, the user interface provided by the mobile application 123 can be a client side application of a client-server environment (e.g., a web browser or downloadable application, such as a mobile app), wherein the processing module 109 is hosted by one or more of the server systems 1001a-d (e.g., in a cloud-based environment) and interacted with by the desktop computer device or mobile computer device. In some distributed systems, the modules of the system 100 can be separately located on server systems 1001a-d and can be in communication with one another across the network 1006.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with a multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for identifying vehicles at a distribution center, the system comprising:
   a database storing load information related to a plurality of loads carried by the vehicles;
   a mobile application associated with a user account and executable on a mobile device associated with a driver of a vehicle, the mobile application when executed:
      acquires the load information associated with the vehicle from the database; and
      generates a machine-readable representation corresponding to the load information associated with the vehicle;
   a computing device in communication with the mobile device and the database, the computing device including a programmable processor which, when executed:
      receives, from a client device associated with the distribution center, an image of the machine-readable representation scanned by the client device associated with the distribution center from the mobile device associated with the driver of the vehicle;
      extracts the load information associated with the vehicle from the image of the machine-readable representation received by the computing device from the client device;
      renders a map of a geographic area including a drop off location at the distribution center of the load carried by the vehicle; and
      transmits the map including the drop off location at the distribution center of the load carried by the vehicle to the mobile device associated with the user account.

2. The system of claim 1, wherein the load information includes:
- a plurality of notifications of the load, the plurality of identifications of the load including at least one of a delivery number, a load number, a purchase order (PO) number, and a bill of lading (BOL) number; and
- additional load information including at least one of trailer number, Standard Carrier Alpha Code (SCAC), seal number, freight type.

3. The system of claim 1, wherein the load information includes a real-time status of unloading a freight and indicating estimated time to complete the unloading of the vehicle.

4. The system of claim 1, wherein the computing device, when executed:
- updates an estimated time of arrival (ETA) of the load based on the load information acquired by the mobile application from the database; and
- transmits the updated ETA to the mobile device associated with the user account.

5. The system of claim 1, wherein the computing device generates and transmits a notification indicating a status of the load.

6. The system of claim 1, wherein the computing device transmits safety requirements of the distribution center to the mobile device and tracks safety reviews of the driver of the vehicle.

7. The system of claim 1, wherein the computing device, when executed:
- renders a map of the geographic area including a location of each load in the distribution center and a route for navigating to the location of the load; and
- transmits the map of the geographic area including a location of each load in the distribution center and a route for navigating to the location of the load to the mobile device associated with the user account.

8. The system of claim 1, wherein the mobile application acquires load documentation associated with the vehicle and compares the acquired load documentation with the load information associated with the vehicle that is stored in the database.

9. The system of claim 8, wherein the mobile application generates an icon indicating whether the load documentation is complete based on load information acquired from the database.

10. The system of claim 1, wherein the mobile device captures at least one image of each pallet of the load and the computing device verifies pallet information based on at least one image of each pallet of the load captured by the mobile device.

11. A computer-implemented method for remotely identifying vehicles at a distribution center, comprising:
- providing a database storing load information related to a plurality of loads carried by the vehicles;
- acquiring, by a mobile application associated with a user account and executable on a mobile device, load information related to a plurality of loads carried by the vehicles;
- generating, by the mobile application, a machine-readable representation corresponding to the load information;
- receiving, by the computing device, from a client device associated with the distribution center, an image of the machine-readable representation scanned by the client device associated with the distribution center from the mobile device associated with the driver of the vehicle;
- extracting, by the computing device, the load information associated with the vehicle from the image of the machine-readable representation received by the computing device from the client device;
- rendering a map of a geographic area including a drop off location at the distribution center of the load carried by the vehicle; and
- transmitting the map including the drop off location at the distribution center of the load carried by the vehicle to the mobile device associated with the user account.

12. The method of claim 11, wherein the load information includes:
- a plurality of notifications of the load, the plurality of identifications of the load including at least one of a delivery number, a load number, a purchase order (PO) number, and a bill of lading (BOL) number; and
- additional load information including at least one of trailer number, Standard Carrier Alpha Code (SCAC), seal number, freight type. a delivery number, a load number, a purchase order (PO) number, and a bill of lading (BOL) number.

13. The method of claim 11, wherein the load information includes a real-time status of unloading a freight indicating estimated time to complete unloading of the vehicle.

14. The method of claim 11, further comprising:
- updating, by the computing device, an estimated time of arrival (ETA) of the load based on the load information acquired by the mobile application from the database; and
- transmitting, by the computing device, the updated ETA to the mobile device associated with the user account.

15. The method of claim 11, further comprising, generating and transmitting, by the computing device, a notification indicating a status of the load.

16. The method of claim 11, further comprising, by the computing device:
- transmitting, by the computing device, safety requirements of the distribution center to the mobile device; and
- tracking safety reviews of the driver of the vehicle.

17. The method of claim 11, further comprising:
- rendering, by the computing device, a map of the geographic area including a location of each load in the distribution center and a route for navigating to the location of the load; and
- transmitting, by the computing device, the map of the geographic area including a location of each load in the distribution center and a route for navigating to the location of the load to the mobile device associated with the user account.

18. The method of claim 11, further comprising, by the mobile application:
- acquiring load documentation associated with the vehicle; and
- comparing the acquired load documentation with the load information associated with the vehicle that is stored in the database.

19. The method of claim 18, further comprising generating, within the mobile application, an icon indicating whether the load documentation is complete based on the load information acquired from the database.

20. The method of claim 11, further comprising:
- capturing at least one image of each pallet of the load by the mobile device; and
- verifying, by the computing device, pallet information based on the at least one image of each pallet of the load captured by the mobile device.

* * * * *